Figure 1:
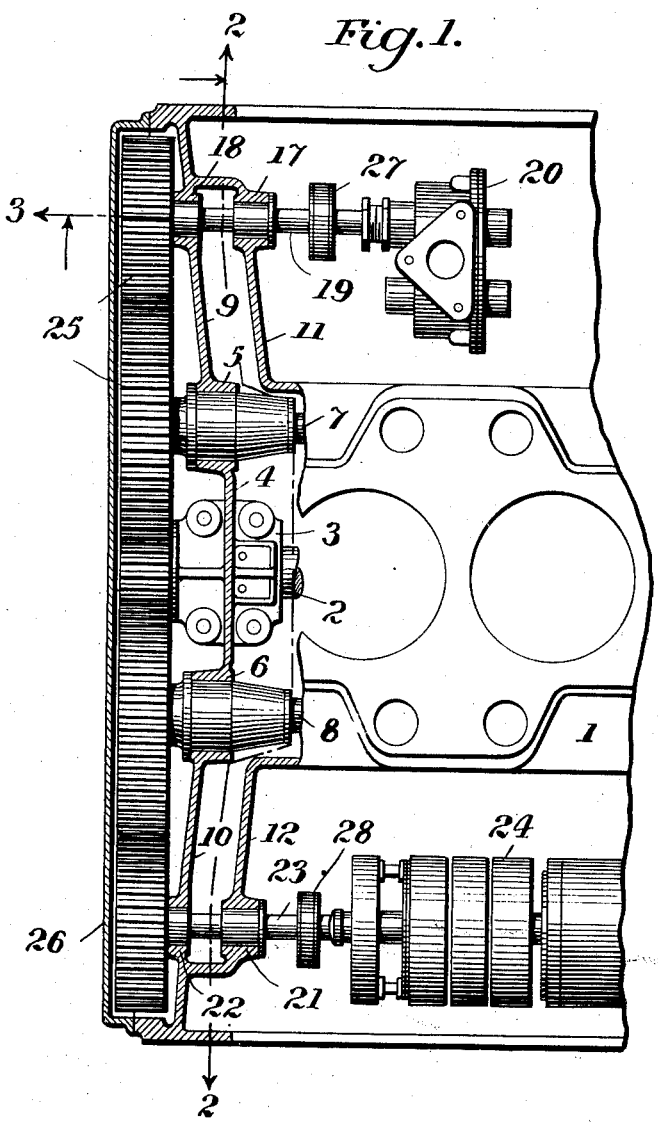

R. HUFF.
HYDROCARBON ENGINE.
APPLICATION FILED AUG. 30, 1907.
1,002,695.
Patented Sept. 5, 1911.
2 SHEETS—SHEET 2.
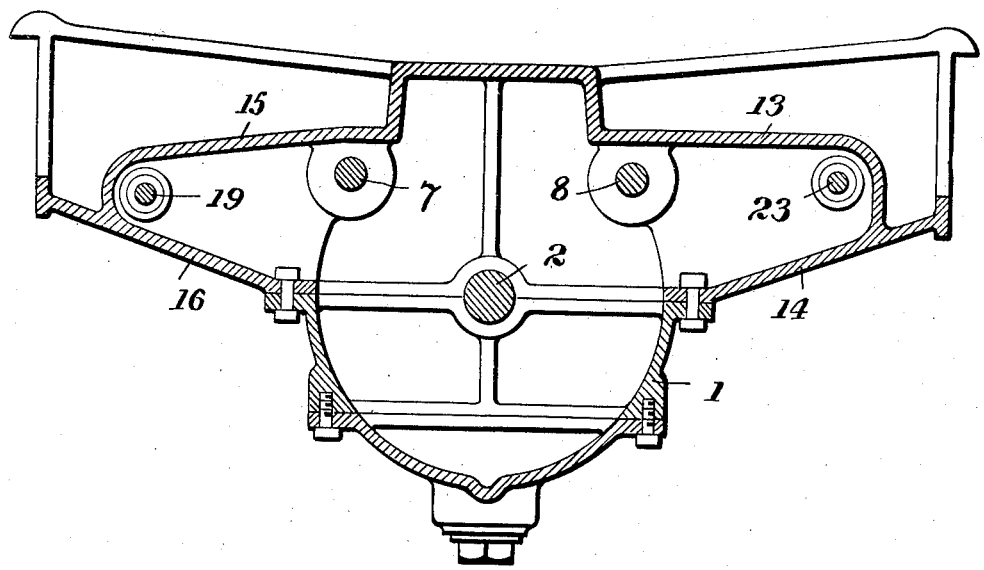
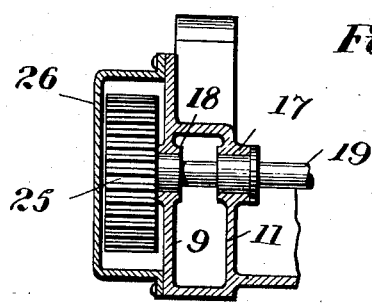

UNITED STATES PATENT OFFICE.

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

HYDROCARBON-ENGINE.

1,002,695.      Specification of Letters Patent.      Patented Sept. 5, 1911.

Application filed August 30, 1907. Serial No. 390,770.

*To all whom it may concern:*

Be it known that I, RUSSELL HUFF, a citizen of the United States, and residing in Detroit, Wayne county, Michigan, have invented certain new and useful Improvements in Hydrocarbon-Engines, of which the following is a specification.

My invention relates to hydrocarbon engines and is particularly adapted to use on motor vehicles, although I do not intend to confine myself to that use.

The object of the invention is to improve the bearings for the working parts of the engine, supported from the crank case, and also to provide means for lubricating the bearings which are outside of the crank case proper by means of the splash system within the crank case.

With these objects in view the invention consists in providing a connection between the bearings and the interior of the crank case whereby the vapor of the oil produced in said case by the splash system is conveyed to the bearings for lubricating purposes, and it also consists in providing double bearings for the working shafts supported by the crank case.

In the accompanying drawings—Figure 1 is a plan view partly in section, showing the invention applied to a crank case; Fig. 2 is a cross section upon the line 2—2 of Fig. 1. Fig. 3 is a section on the line 3 of Fig. 1.

In the drawings I have shown the crank case 1 made up of three sections united by bolts, but in so far as the present invention is concerned the particular form of crank case is not material. Within the crank case is mounted the crank shaft 2 supported in the bearing 3 carried by the end wall 4 of the crank case. This end wall 4 has therein bearings 5, 6, for the cam shafts 7, 8, which are within the crank case. Extending beyond the side walls of the crank case and constituting continuations of the end wall 4 are the web extensions 9 and 10. Parallel to the webs 9 and 10 are the webs 11 and 12 which are shown integral with the crank case and which have cross webs 13 and 14 and 15 and 16 uniting them with the webs 9 and 10 to form hollow pockets or inclosed arms which communicate with the interior of the crank case. The webs 9 and 11 have near their outer ends alined bearings 17, 18 for the counter shaft 19 which drives the water pump 20, and the webs 10 and 12 have alined bearings 21, 22 for the counter shaft 23, which drives the magneto 24. The shafts 19 and 23 have detachable joints 27, 28.

It will be noted that all of the shafts mentioned are parallel and each carries on its outer end beyond the bearings mentioned a gear wheel. These gear wheels 25, intermesh so that each of the shafts is driven from the crank shaft 2. These gear wheels are in a gear case formed on the end of the crank case by the cover plate 26 which is attached in any suitable manner to the crank case and to the outer ends of the webs 9 and 10.

The crank case 1 is adapted to contain oil which is splashed and thrown about by the turning of the cranks so that it will reach and lubricate the bearings within the crank case, and since the extensions formed by the webs 9, 11, and 10, 12 communicate with the interior of the crank case, the oil vapor therein will pass into these extensions and will lubricate the bearings 17, 18 and 21, 22. The two webs not only convey the oil vapor to the bearings, but also make the double bearings and thereby increase the strength and stability of the bearings. The bottom walls of these extensions from the crank case are made inclined so that any surplus oil thrown into them will be returned by gravity to the crank case.

Having thus described my invention what I claim and desire to secure by Letters Patent is:

1. In a hydrocarbon engine, a crank case adapted to contain oil and having a narrow hollow arm extending laterally from the body of the case, said arm having alined bearings in its walls, a crank shaft mounted in the crank case, a counter shaft mounted in said alined bearings, and means for driving the counter shaft from the crank shaft, the alined bearings of the counter shaft being arranged to be lubricated by oil splashed from the body of the crank case into said hollow arm.

2. In a hydrocarbon engine, a crank case adapted to contain oil and having a narrow hollow arm extending laterally from the body of the case, said arm having alined bearings in its walls, a crank shaft mounted in the crank case, a counter shaft mounted in said alined bearings, means for driving the counter shaft from the crank shaft, the alined bearings of the counter shaft being arranged to be lubricated by oil splashed from the body of the crank case into said hollow arm, and the bottom wall of said arm being inclined downwardly toward the crank case, whereby surplus oil thrown into the arm will be returned by gravity to the crank case.

3. In a hydrocarbon engine, the combination with a crank case having oppositely arranged laterally extending narrow hollow arms, the opposite walls of each of the arms being provided with alined bearings, of a crank shaft mounted in the crank case, a counter shaft on each side of the crank case, each counter shaft having its end portion mounted in the alined bearings of its respective arm, and means for communicating movement from the crank shaft to the counter shaft, the counter shaft bearings being arranged to be lubricated by oil splashed into said arms by the crank shaft and the lower walls of the arms being adapted to return the surplus oil to the crank case.

4. In a hydrocarbon engine, the combination with a crank case, of web extensions projecting beyond the side walls of the crank case, a second web extending from the case upon each side thereof near the first web, connecting walls joining the webs upon each side to form extensions of the crank case chamber, and bearings in the said webs.

5. In a hydrocarbon engine, the combination of a crank case, a hollow arm extending laterally from said crank case and communicating with the interior thereof, a crank shaft bearing in the end wall of the crank case, alined bearings for the counter-shaft in the walls of the hollow arm, a train of gears outside of the crank case connecting the crank shaft and counter-shaft, and a cover for said gears, the hollow arm providing for the lubrication of the counter-shaft bearings by oil splashed from the crank case.

6. In a hydrocarbon engine, the combination of a crank case, hollow arms extending in opposite directions from the crank case and communicating with the interior thereof, a crank shaft having a bearing in the end wall of the crank case, a counter-shaft on each side of the crank case, each counter-shaft having two alined bearings in the walls of its respective hollow arm, trains of gears connecting the crank shaft with the counter-shafts for driving the latter, and a cover over said gears and forming, together with the crank case and hollow arms, a gear case, as and for the purpose set forth.

7. In a hydrocarbon engine, the combination with a crank case having a wall extending across one end thereof, of a web extension projecting beyond the side wall of the crank case, a second web extending from the crank case near the first web, connecting walls joining the webs to form an extension of the crank case chamber, and bearings in said webs.

In testimony whereof I affix my signature in presence of two witnesses.

RUSSELL HUFF.

Witnesses:
 MILTON TIBBETTS,
 CLARA I. DALE.